(12) United States Patent
Kaack et al.

(10) Patent No.: US 11,698,009 B2
(45) Date of Patent: Jul. 11, 2023

(54) EXHAUST GAS AFTERTREATMENT SYSTEM AND METHOD FOR EXHAUST GAS AFTERTREATMENT IN AN INTERNAL COMBUSTION ENGINE

(71) Applicant: VOLKSWAGEN AKTIENGESELLSCHAFT, Wolfsburg (DE)

(72) Inventors: Michael Kaack, Rötgesbüttel (DE); Stefan Paukner, Wolfsburg (DE); Falk-Christian Baron Von Ceumern-Lindenstjerna, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/937,968

(22) Filed: Jul. 24, 2020

(65) Prior Publication Data
US 2021/0025303 A1 Jan. 28, 2021

(30) Foreign Application Priority Data
Jul. 26, 2019 (DE) ...................... 10 2019 211 114.9

(51) Int. Cl.
*F01N 3/00* (2006.01)
*F01N 3/035* (2006.01)
*F01N 3/025* (2006.01)
(Continued)

(52) U.S. Cl.
CPC ........... *F01N 3/035* (2013.01); *F01N 3/0253* (2013.01); *F01N 3/101* (2013.01); *F01N 3/2033* (2013.01);
(Continued)

(58) Field of Classification Search
CPC ........ F01N 3/035; F01N 3/0253; F01N 3/101; F01N 3/2033; F01N 3/36; F01N 2250/02;
(Continued)

(56) References Cited

U.S. PATENT DOCUMENTS 6,634,169 B1 * 10/2003 Andersen ................ F01N 3/101
60/284
2006/0153761 A1 7/2006 Bandl-Konrad et al.
(Continued)

FOREIGN PATENT DOCUMENTS

CN 101985893 A 3/2011
CN 113227547 A 8/2021
(Continued)

OTHER PUBLICATIONS

Search report for German Patent Application No. 10 2019 211 114.9, dated May 22, 2020.
(Continued)

*Primary Examiner* — Matthew T Largi
(74) *Attorney, Agent, or Firm* — Pearl Cohen Zedek Latzer Baratz LLP

(57) ABSTRACT

An exhaust gas aftertreatment system for an internal combustion engine has an exhaust system that can be connected to an outlet of the internal combustion engine. A three-way catalytic converter that is situated close to the engine and, downstream from the three-way catalytic converter that is situated close to the engine, a second catalytic converter and a particle reduction device are arranged in the direction in which an exhaust gas of the internal combustion engine flows through an exhaust gas channel of the exhaust system. A fuel injector is arranged on the exhaust gas channel so as to inject fuel downstream from the three-way catalytic converter that is situated close to the engine and upstream from the second catalytic converter, and the exhaust system
(Continued)

comprises a secondary air system with which secondary air can be blown into the exhaust gas channel downstream from the three-way catalytic converter that is situated close to the engine and upstream from the second catalytic converter.

13 Claims, 2 Drawing Sheets

(51) Int. Cl.
*F01N 3/10* (2006.01)
*F01N 3/20* (2006.01)
*F01N 3/36* (2006.01)

(52) U.S. Cl.
CPC ............ *F01N 3/36* (2013.01); *F01N 2250/02* (2013.01); *F01N 2340/02* (2013.01); *F01N 2390/02* (2013.01); *F01N 2610/03* (2013.01)

(58) Field of Classification Search
CPC ............ F01N 2340/02; F01N 2390/02; F01N 2610/03
See application file for complete search history.

(56) References Cited

U.S. PATENT DOCUMENTS

| | | | | |
|---|---|---|---|---|
| 2011/0219752 A1* | 9/2011 | Gonze | ................... | F01N 3/101 60/299 |
| 2011/0289906 A1* | 12/2011 | Morley | ................... | F01N 3/035 60/320 |
| 2013/0008162 A1* | 1/2013 | Ruona | ................. | F02D 19/0655 60/605.1 |
| 2013/0327023 A1* | 12/2013 | Schluter | ................... | F01N 3/08 60/274 |
| 2016/0368580 A1* | 12/2016 | Shomura | ................ | B63H 20/24 |
| 2019/0195115 A1* | 6/2019 | Paukner | ................... | F01N 3/035 |
| 2021/0189941 A1* | 6/2021 | Riechert | ................... | F01N 3/30 |

FOREIGN PATENT DOCUMENTS

| | | | | |
|---|---|---|---|---|
| DE | 103 00 298 A1 | 7/2004 | | |
| DE | 102012021573 A1 * | 5/2014 | ............... | F23G 7/07 |
| DE | 10 2015 212 846 A1 | 1/2017 | | |
| DE | 102016208289 A1 * | 8/2017 | ........... | F01N 13/009 |
| DE | 102016206394 A1 * | 10/2017 | ............. | F01N 9/002 |
| DE | 102016114901 A1 * | 2/2018 | .............. | F01N 11/00 |
| DE | 10 2017 201 742 A1 | 8/2018 | | |
| EP | 1 582 709 A2 | 10/2005 | | |

OTHER PUBLICATIONS

Search Report for European Patent Application EP 20 18 0 3769, dated Sep. 10, 2020.

* cited by examiner

EXHAUST GAS AFTERTREATMENT SYSTEM AND METHOD FOR EXHAUST GAS AFTERTREATMENT IN AN INTERNAL COMBUSTION ENGINE

CROSS-REFERENCE TO RELATED APPLICATIONS

This application claims priority from German Patent Application No. 10 2019 211 114.9 filed Jul. 26, 2019, which is hereby incorporated by reference.

FIELD OF THE INVENTION

The invention relates to an exhaust gas aftertreatment system as well as to a method for exhaust gas aftertreatment in an internal combustion engine having such an exhaust gas aftertreatment system, according to the generic part of the independent claims.

BACKGROUND OF THE INVENTION

Since legislation on exhaust-gas emissions is becoming increasingly stringent, the automotive industry is faced with high requirements, which are being met by appropriate measures aimed at reducing the raw emissions of engines as well as by an appropriate aftertreatment of the exhaust gas. The introduction of European emission standard Euro 6 for gasoline engines stipulates a limit value for the particle number which, in many cases, requires the use of a gasoline particulate filter. Such soot particles are formed especially after a cold start of the internal combustion engine due to an incomplete combustion in combination with a sub-stoichiometric air-fuel ratio as well as due to cold cylinder walls during the cold start. Therefore, the cold start phase plays a decisive role when it comes to complying with the statutorily stipulated limit values for particulate matter. During driving operation, such a gasoline particulate filter is further laden with soot. This gasoline particulate filter has to be regenerated continuously or periodically so as to prevent the exhaust-gas counter-pressure from rising excessively. The rise in the exhaust-gas counter-pressure can lead to increased fuel consumption by the internal combustion engine, to power loss, and to a deterioration of the running smoothness all to way to engine misfiring. In order to use oxygen to carry out a thermal oxidation of the soot that has been captured in the gasoline particulate filter, there is a need for a sufficiently high temperature in conjunction with the concurrent presence of oxygen in the exhaust system of the gasoline engine. Since modern gasoline engines are normally operated without an oxygen excess at a stoichiometric air-fuel ratio (=1), additional measures are necessary for this purpose. Possible measures in this context include, for instance, raising the temperature by shifting the advance angle, temporarily shifting towards a lean mixture in the gasoline engine, blowing secondary air into the exhaust system or a combination of these measures. So far, preference has been given to shifting the advance angle in the late direction in combination with a shift towards a lean mixture in the gasoline engine since this method makes do without the need for additional components and can deliver a sufficient amount of oxygen at most operating points of the gasoline engine.

Owing to the high efficiency levels in gasoline engines, a regeneration of a particulate filter positioned in the undercarriage is impossible in certain operating situations, so that special driving cycles are required for the regeneration of a particulate filter situated in the undercarriage. It is advantageous for the particulate filter to be positioned close to the engine since, in this case, higher exhaust gas temperatures are present on the particulate filter, making it easier to heat it up to a regeneration temperature.

Within the scope of a further tightening of the emissions legislation, motor vehicles will have to comply with Real Driving Emissions (RDE) exhaust gas limit values. In prior-art exhaust gas aftertreatment systems, the catalytic converters are arranged as close to the engine as possible so as to allow them to heat up quickly after a cold start of the internal combustion engine. However, the position close to the engine causes the catalytically active surface of the catalytic converters to age more quickly during high-load operation. This is why catalytically coated gasoline particulate filters, which are also referred to as four-way catalytic converters, are arranged in a position in the undercarriage of a motor vehicle in order to reduce the thermal stress for such a four-way catalytic converter.

German patent application DE 10 2015 212 846 A1 discloses an exhaust gas aftertreatment system for an internal combustion engine having a three-way catalytic converter that is situated close to the engine, a NO storage catalytic converter and a particulate filter arranged in a position in the undercarriage of a motor vehicle. In this context, in order to desulfurize the NO storage catalytic converter and to simultaneously regenerate the particulate filter, an alternating switch-over between a sub-stoichiometric air-fuel ratio and a super-stoichiometric air-fuel ratio is carried out multiple times until the NO storage catalytic converter has been desulfurized and the particulate filter has been completely regenerated.

German patent application DE 10 2017 201 742 A1 discloses a method for heating up and regenerating a particulate filter that is arranged downstream from a catalytic converter in the exhaust gas stream of a gasoline engine by means of a device for feeding secondary air into the exhaust gas stream between the catalytic converter and the particulate filter. The method is characterized in that it is possible to compensate for cross-sensitivities of a lambda sensor that serves to detect exhaust gas compounds other than oxygen and that is arranged between the catalytic converter and the particulate filter.

Moreover, European patent application EP 1 582 709 A2 discloses a method for the regeneration of a particulate filter arranged in the exhaust gas line of a self-igniting internal combustion engine, especially in a motor vehicle. In this context, an oxidation catalytic converter as well as, downstream from the oxidation catalytic converter, a particulate filter are both arranged in the exhaust system of the self-igniting internal combustion engine, whereby, in order to heat the particulate filter, fuel can be metered into the exhaust system upstream from the oxidation catalytic converter and it is exothermally converted on the catalytically active surface of the oxidation catalytic converter together with the residual oxygen in the exhaust gas stream, as a result of which the particulate filter is heated up.

The invention is based on the objective of facilitating the regeneration of a four-way catalytic converter positioned in the undercarriage of a stoichiometrically operated gasoline engine and especially of improving the heating up of the four-way catalytic converter in order to regenerate the four-way catalytic converter.

SUMMARY OF THE INVENTION

According to the invention, this objective is achieved by an exhaust gas aftertreatment system for an internal combustion engine. The exhaust gas aftertreatment system has an exhaust system that can be connected to an outlet of the internal combustion engine. A three-way catalytic converter that is situated close to the engine and, downstream from the three-way catalytic converter that is situated close to the engine, a second catalytic converter as well as a particle reduction device are arranged in the direction in which an exhaust gas of the internal combustion engine flows through an exhaust gas channel of the exhaust system. It is provided for a fuel injector to be arranged on the exhaust gas channel so as to inject fuel downstream from the three-way catalytic converter that is situated close to the engine and upstream from the second catalytic converter. The exhaust system also comprises a secondary air system with which secondary air can be blown into the exhaust gas channel downstream from the three-way catalytic converter that is situated close to the engine and upstream from the second catalytic converter. In this context, a three-way catalytic converter that is situated close to the engine refers to a three-way catalytic converter whose inlet has an exhaust gas travel distance of less than 80 cm, preferably less than 50 cm, as measured from an outlet of the internal combustion engine. The exhaust gas aftertreatment system according to the invention can minimize the emissions during normal operation of the internal combustion engine as well as during a heating phase or during the regeneration of the particle reduction device. Moreover, heating up the particle reduction device to its regeneration temperature is also possible during low-load operation of the internal combustion engine.

The features put forward in the dependent claims constitute advantageous improvements and non-trivial refinements of the exhaust gas aftertreatment system put forward in the independent claim.

In a preferred embodiment of the invention, it is provided for the second catalytic converter and the particle reduction device to be combined in a shared component as a four-way catalytic converter. A four-way catalytic converter can minimize the particle emissions as well as the emissions of gaseous pollutants. Here, owing to its arrangement in a position in the undercarriage of a motor vehicle, the four-way catalytic converter can be configured to be appropriately large, as a result of which the rise in the exhaust-gas counter-pressure can be limited and a sufficient catalytically active volume can be provided in order to efficiently convert the pollutants in the exhaust gas stream of the internal combustion engine, even during high-load operation.

In another preferred embodiment of the invention, it is provided for the particle reduction device to be configured as a gasoline particulate filter that is arranged downstream from the second catalytic converter as seen in the direction of flow. Since the emission-reducing functionalities are spread over a three-way catalytic converter and a gasoline particulate filter, the service life can be extended. Moreover, the conversion performance for gaseous pollutants can be increased.

It is especially preferred for the gasoline particulate filter to be configured as an uncoated particulate filter. Thanks to an uncoated particulate filter, the flow resistance can be reduced, as a result of which the regeneration intervals of the particulate filter can be prolonged.

In another preferred embodiment of the exhaust gas aftertreatment system, it is provided for the second catalytic converter to be configured as a second three-way catalytic converter. Thanks to a second three-way catalytic converter, the conversion performance for gaseous emissions can be increased further as compared to a four-way catalytic converter, even though the catalytic converter is the same size.

In an advantageous embodiment of the invention, it is provided for the second catalytic converter to be positioned at a distance of at least 75 cm from the three-way catalytic converter that is situated close to the engine. In this manner, the thermal load for the second catalytic converter during high-load operation of the internal combustion engine can be reduced, thereby slowing down the ageing of the catalytically active surface of the second catalytic converter, especially the catalytically active surface of a four-way catalytic converter.

According to an advantageous embodiment of the invention, it is provided for the fuel injector to be arranged downstream from a feed point of the secondary air system. As a result, the longest possible path is available for the injected fuel to evaporate and mix with the exhaust gas stream of the internal combustion engine. An appropriate positioning can promote the vaporization of the fuel by means of the secondary air system, so that the fuel evaporates more quickly.

It is especially preferable for a mixing segment with a length of at least 50 cm to be formed downstream from the fuel injector and upstream from a feed point of the secondary air system as well as upstream from the second catalytic converter. In this manner, it can be ensured that the injected fuel and the blown-in secondary air are sufficiently mixed with the exhaust gas stream before entering the second catalytic converter.

In another improvement of the invention, it is provided that three lambda sensors are arranged in the exhaust system, whereby the first lambda sensor is arranged upstream from the three-way catalytic converter that is situated close to the engine, whereby the second lambda sensor is arranged downstream from the three-way catalytic converter that is situated close to the engine and upstream from the fuel injector as well as from the feed point of the secondary air system, and whereby the third lambda sensor is arranged downstream from the fuel injector and downstream from the feed point of the secondary air system and upstream from the second catalytic converter.

Here, it is especially preferred for the first lambda sensor to be configured as a broadband sensor and for the second and third lambda sensors to be configured as step change sensors. This permits a particularly efficient regulation of the air-fuel ratio in the combustion chambers of the internal combustion engine. Consequently, the raw emissions of the internal combustion engine can be minimized, as a result of which the stress and an associated ageing of the exhaust gas aftertreatment components can be reduced.

According to the invention, a method for exhaust gas aftertreatment in an internal combustion engine having such an exhaust gas aftertreatment system is being proposed which comprises the following steps:

ascertaining a soot load on the particle reduction device,
heating up the exhaust system by means of internal engine-heating measures until the second catalytic converter has reached its light-off temperature,
simultaneously injecting fuel by means of the fuel injector and blowing secondary air into the exhaust gas channel downstream from the three-way catalytic converter that is situated close to the engine and upstream from the second catalytic converter, whereby
the injected fuel is exothermally converted with the secondary air on the catalytically active surface of the second catalytic converter until the particle reduction device has reached its regeneration temperature, and oxidizing the soot particles captured in the particle reduction device, whereby the oxygen for the oxidation of the soot particles is supplied by the secondary air system.

The method according to the invention allows an emission-free regeneration of the particle reduction device. Depending on the dimensioning of the secondary air system and of the fuel injector, a high heating output can be provided by catalytically heating the second catalytic converter. Therefore, a regeneration of the particle reduction device can also be achieved when it is installed in a position in the undercarriage of a motor vehicle, even during a low-load operating cycle of the internal combustion engine.

In an advantageous improvement of the method, it is provided that, while the method is being carried out, the internal combustion engine is operated at a stoichiometric air-fuel ratio ($\lambda=1$). Owing to the consistently stoichiometric engine operation, the gaseous emissions of the engine are converted during the entire regeneration on the three-way catalytic converter that is situated close to the engine. By dispensing with a rich phase, no secondary emissions such as, for example, ammonia, are formed on the three-way catalytic converter that is situated close to the engine during the heating up and the regeneration of the particle reduction device. As a result, during all operating states of the internal combustion engine, an efficient conversion of the exhaust gas emissions can be ensured, and a regeneration of the particle reduction device can be carried out without an increase in the tailpipe emissions.

According to an advantageous embodiment of the method, it is provided that, during a heating phase of the particle reduction device, the fuel injector and the secondary air system establish a stoichiometric or slightly super-stoichiometric air-fuel ratio downstream from the three-way catalytic converter that is situated close to the engine. As a result, during the heating phase or during the regeneration of the particle reduction device, secondary emissions, which can no longer be converted by a downstream exhaust gas aftertreatment component, can be prevented from forming on the second catalytic converter.

In an advantageous embodiment of the method, it is provided that, during the regeneration of the particle reduction device, fuel continues to be injected into the exhaust gas channel downstream from the three-way catalytic converter that is situated close to the engine. Consequently, in conjunction with blowing in secondary air, the temperature of the particle reduction device can be regulated so that, on the one hand, thermal damage to the particle reduction device is avoided prevented and, on the other hand, the particle reduction device can be prevented from cooling off to below its regeneration temperature, thus preventing the regeneration reaction from stopping.

In this manner, a quick and complete regeneration of the particle reduction device can be ensured.

In one variant of the method, it can be advantageously provided that the internal engine-heating measures are maintained during the heating phase of the particle reduction device and/or during the regeneration of the particle reduction device. Thanks to internal engine-heating measures, additional heat can be introduced into the exhaust system. This can especially be helpful during low-load operation of the internal combustion engine in order to promptly reach and/or maintain the temperature needed for the regeneration of the particle reduction device.

Unless otherwise indicated in a specific case, the various embodiments of the invention cited in this application can be advantageously combined with each other.

BRIEF DESCRIPTION OF THE INVENTION

The invention will be explained below on the basis of embodiments making reference to the accompanying drawings. In this context, identical components or components having the same function are provided with the same reference numerals. The following is shown:

DETAILED DESCRIPTION OF THE INVENTION

Figure 1:
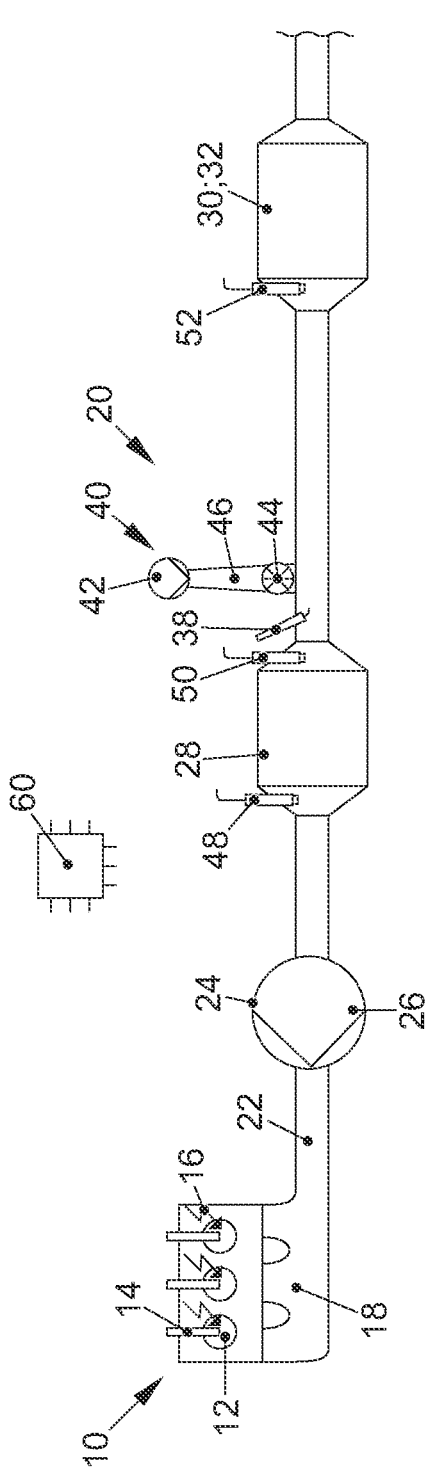
FIG. 1 is a first embodiment of an internal combustion engine with an exhaust gas aftertreatment system according to the invention.

FIG. 1 shows a schematic depiction of an internal combustion engine 10 whose outlet 18 is connected to an exhaust system 20 of an exhaust gas aftertreatment system for exhaust gas aftertreatment of an exhaust gas stream of an internal combustion engine 10 according to the invention. The internal combustion engine 10 is configured as a gasoline engine that is externally ignited by means of external ignition means, especially by means of spark plugs 16. The internal combustion engine 10 has several combustion chambers 12 in which an air-fuel mixture is burned. For this purpose, a fuel injector 14 is provided on each of the combustion chambers 12 in order to inject fuel into the combustion chambers 12. The internal combustion engine 10 is preferably configured as an internal combustion engine 10 charged by means of an exhaust gas turbocharger 24, whereby a turbine 26 of the exhaust gas turbocharger 24 is arranged downstream from the outlet 18 and upstream from a three-way catalytic converter 28 that is situated close to the engine. The exhaust system 20 comprises an exhaust gas channel 22 in which a second catalytic converter 30 is arranged in an undercarriage position of the motor vehicle in the direction in which an exhaust gas flows through the exhaust gas channel 22 downstream from the three-way catalytic converter 28 that is situated close to the engine. The second catalytic converter 30 is configured as a four-way catalytic converter 32 and it combines a three-way catalytic function with a particle reduction function.

A fuel injector 38 for injecting a fuel into the exhaust gas channel 22 is arranged downstream from the three-way catalytic converter 28 that is situated close to the engine and upstream from the four-way catalytic converter 32. Furthermore, a feed point for a secondary air system 40 is formed on the exhaust gas channel 22 downstream from the three-way catalytic converter 28 that is situated close to the engine and upstream from the four-way catalytic converter 32, whereby secondary air can be blown into the exhaust gas channel 22 at said feed point. Downstream from the fuel injector 38 and downstream from the feed point of the secondary air system 40, a mixing segment is formed in which the fuel introduced via the fuel injector 38 and the secondary air introduced into the exhaust gas channel 22 via the secondary air system are mixed with the exhaust gas stream of the internal combustion engine 10.

The secondary air system 40 comprises a secondary air pump 42 that is connected via a secondary air line 46 to a feed point of the secondary air system 40 on the exhaust gas channel 22 of the internal combustion engine 10. A secondary air valve 44, which can regulate the secondary air volume that is blown into the exhaust gas channel, is arranged in the secondary air line 46 or at the feed point.

A first lambda sensor 48, which is preferably configured as a broadband sensor, is arranged on the exhaust gas channel 22 upstream from the three-way catalytic converter 28 that is situated close to the engine. A second lambda sensor 50, which is preferably configured as a step change sensor, is arranged downstream from the three-way catalytic converter 28 that is situated close to the engine and upstream from the fuel injector 38 as well as upstream from the feed point of the secondary air system. A third lambda sensor 52, which is configured as a step change sensor or as a broadband sensor, is arranged downstream from the fuel injector 38 as well as downstream from the feed point of the secondary air system 40 and upstream from the four-way catalytic converter 32. The internal combustion engine 10 can be controlled by means of a control unit 60 that regulates the fuel volume injected into the combustion chambers. The control unit 60 is connected via signal lines to the lambda sensors 48, 50, 52 in order to establish an emission-optimal air-fuel ratio in the combustion chambers of the internal combustion engine 10.

Figure 2:
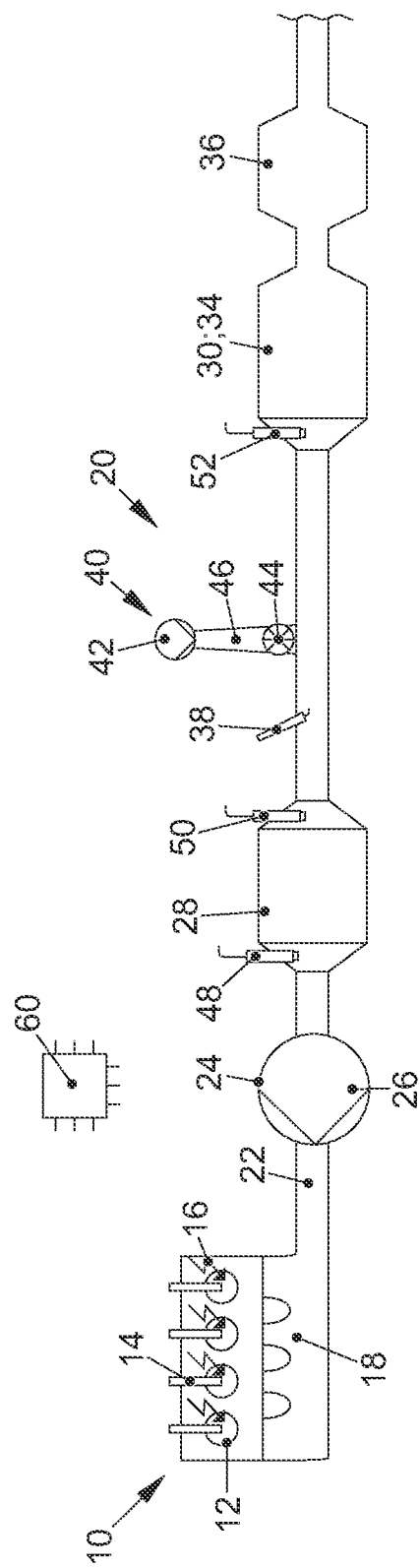
FIG. 2 is an alternative embodiment of an exhaust gas aftertreatment system according to the invention for an internal combustion engine.

FIG. 2 shows an alternative embodiment for an exhaust gas aftertreatment system according to the invention. With an essentially identical structure to the one shown in FIG. 1, in this embodiment, the second catalytic converter 30 is configured as a second three-way catalytic converter 34. The second three-way catalytic converter 34 is followed by a preferably uncoated particulate filter 36 in order to capture the particle emissions of the internal combustion engine 10.

The internal combustion engine 10 is operated at a stoichiometric air-fuel ratio ($\lambda=1$), whereby the gaseous pollutants are converted by the three-way catalytic converter 28 that is situated close to the engine. Here, a soot load of the four-way catalytic converter 32 or of the particulate filter 36 is ascertained, for example, by creating a model or by carrying out a differential pressure measurement over the four-way catalytic converter 32 or the particulate filter 36. If the four-way catalytic converter 32 or the particulate filter 36 exceeds a defined load state, a regeneration of the four-way catalytic converter 32 or of the particulate filter 36 is initiated.

Figure 3:
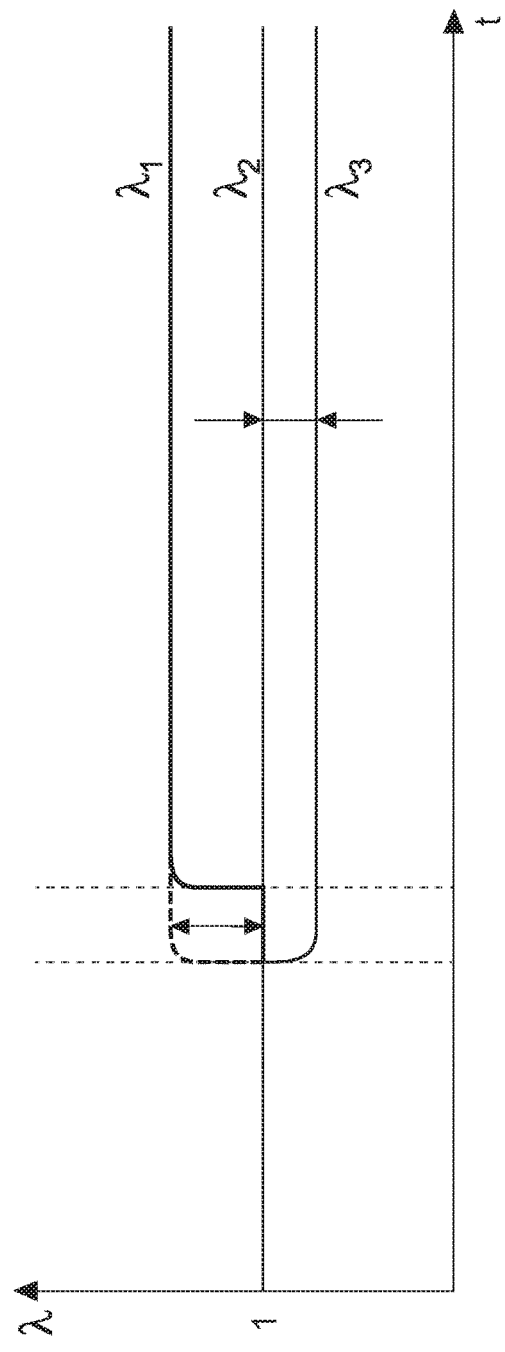
FIG. 3 is a curve of the air-fuel ratio over time during the execution of a method according to the invention for exhaust gas aftertreatment in an internal combustion engine.

FIG. 3 shows the curve of the air-fuel ratio over time during the execution of a method according to the invention for exhaust gas aftertreatment in the internal combustion engine 10. The method begins with the start S and it comprises a preheating phase I during which the exhaust gas stream of the internal combustion engine 10 is heated up by internal engine-heating measures such as a shift of the advance angle in the late direction in order to heat the four-way catalytic converter 32 or the second three-way catalytic converter 34 to its light-off temperature. Once the four-way catalytic converter 32 or the second three-way catalytic converter 34 has reached its light-off temperature in a heating phase II, secondary air is blown in at same the time as fuel is injected into the exhaust gas channel 22. The internal combustion engine 10 continues to be operated stoichiometrically. Owing to the secondary air that is blown in, oxygen is available to exothermally convert the injected fuel on the catalytically active surface of the four-way catalytic converter 32 or the second three-way catalytic converter 34. During the heating phase II, the mixed lambda value upstream from the four-way catalytic converter 32 or from the three-way catalytic converter 34 is set so as to be stoichiometric or lean (up to, for example, $\lambda=1.1$). The heating phase II continues until the regeneration temperature $T_{reg}$ on the four-way catalytic converter 32 or on the particulate filter 36 has been reached. The lambda regulation is carried out by the third lambda sensor 52 upstream from the four-way catalytic converter 32 or from the second three-way catalytic converter 34. In a subsequent regeneration phase III, the blowing in of secondary air by the secondary air system 40 as well as the fuel injection by the fuel injector 38 remain active. During the regeneration phase III, the mixed lambda value upstream from the four-way catalytic converter 32 or from the second three-way catalytic converter 34 is set so as to be super-stoichiometric ($\lambda=1.05$ to 1.1) in order to supply the oxygen for the soot oxidation. Regeneration phase III is continued until a lower soot load threshold is detected. This can be done via a model or, for example, by means of a counter-pressure measurement or a differential pressure measurement.

Figure 4:
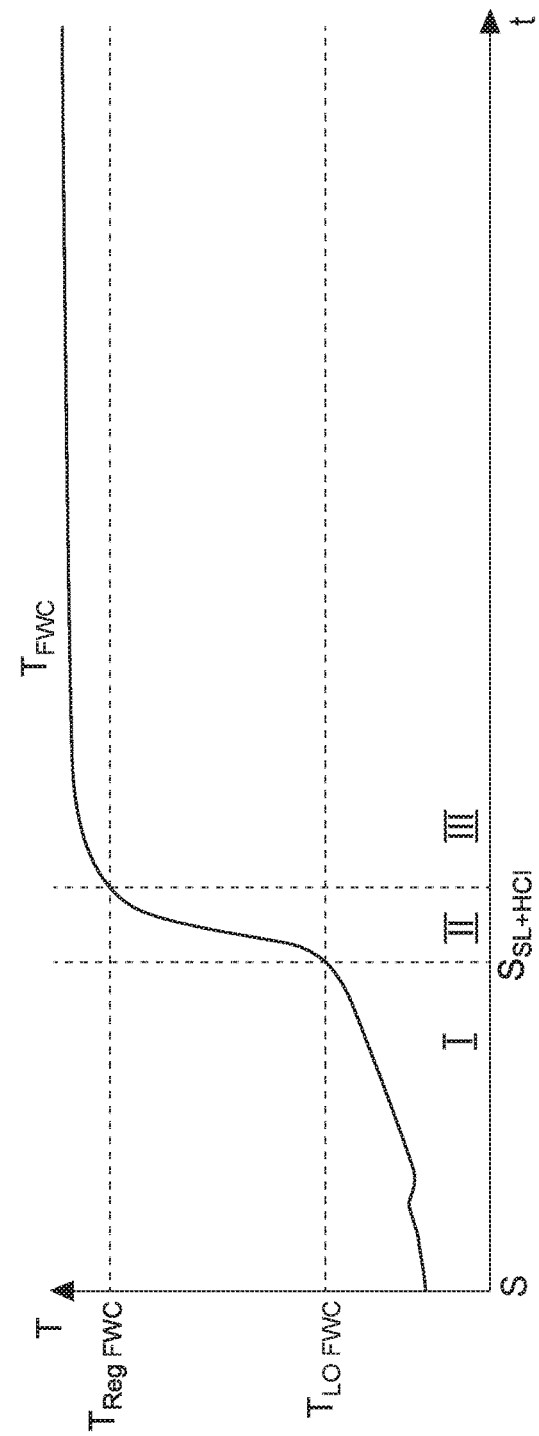
FIG. 4 is a temperature curve of the particle reduction device during the execution of a method according to the invention for exhaust gas aftertreatment.

FIG. 4 shows the temperature curve of the particle reduction device during the execution of a method according to the invention for exhaust gas aftertreatment, wherein:

$T_{reg}$ FWC=regeneration temperature of the four-way catalytic converter $T_{LO}$ FWC=low temperature of the four-way catalytic converter $S_{SL+HCI}$=start of secondary air and fuel injection $T_{FWC}$=temperature of the four-way catalytic converter.

LIST OF REFERENCE NUMERALS

10 internal combustion engine
12 combustion chamber
14 fuel injector
16 spark plug
18 outlet
20 exhaust system
22 exhaust gas channel
24 exhaust gas turbocharger
26 turbine
28 three-way catalytic converter
30 second catalytic converter
32 four-way catalytic converter
34 second three-way catalytic converter
36 particulate filter
38 fuel injector
40 secondary air system
42 secondary air pump
44 secondary air valve
46 secondary air line
48 first lambda sensor/broadband sensor
50 second lambda sensor/step change sensor
52 third lambda sensor/step change sensor
60 control unit

The invention claimed is:

1. An exhaust gas aftertreatment system for an internal combustion engine comprising:
    an exhaust system in which a three-way catalytic converter that is situated close to the engine and, downstream from the three-way catalytic converter that is situated close to the engine, a second catalytic converter, and a particulate filter are arranged in a direction in which an exhaust gas of the internal combustion engine flows through an exhaust gas channel of the exhaust system, and a fuel injector arranged on the exhaust gas channel and configured so as to inject fuel into the exhaust gas channel downstream from the three-way catalytic converter that is situated close to the engine and upstream from a feed point and the second catalytic converter, wherein the exhaust system comprises a secondary air system having an air pump and an air valve with which a regulated volume of secondary air can be introduced via the feed point and blown into the exhaust gas channel downstream from the three-way catalytic converter that is situated close to the engine, downstream of the fuel injector, and upstream from the second catalytic converter, and wherein three lambda sensors are arranged in the exhaust system, whereby a first lambda sensor is arranged upstream from the three-way catalytic converter that is situated close to the engine, whereby a second lambda sensor is arranged downstream from the three-way catalytic converter that is situated close to the engine and upstream from the fuel injector as well as from the feed point of the secondary air system, and whereby a third lambda sensor is arranged downstream from the fuel injector and downstream from the feed point of the secondary air system and upstream from the second catalytic converter.

2. The exhaust gas aftertreatment system according to claim 1, wherein the second catalytic converter and the particulate filter are combined in a shared component as a four-way catalytic converter.

3. The exhaust gas aftertreatment system according to claim 1, wherein the particulate filter is configured as a gasoline particulate filter that is arranged downstream from the second catalytic converter as seen in the direction of flow.

4. The exhaust gas aftertreatment system according to claim 3, wherein the gasoline particulate filter is configured as an uncoated particulate filter.

5. The exhaust gas aftertreatment system according to claim 1, wherein the second catalytic converter is configured as a second three-way catalytic converter.

6. The exhaust gas aftertreatment system according to claim 1, wherein the second catalytic converter is positioned at a distance of at least 75 cm from the three-way catalytic converter that is situated close to the engine.

7. The exhaust gas aftertreatment system according to claim 1, wherein a mixing segment with a length of at least 50 cm is formed downstream from the fuel injector and downstream from a feed point of the secondary air system as well as upstream from the second catalytic converter.

8. The exhaust gas aftertreatment system according to claim 1,
wherein the first lambda sensor is configured as a broadband sensor, and
wherein the second and third lambda sensors are configured as step change sensors.

9. A method for exhaust gas aftertreatment in an internal combustion engine having the exhaust gas aftertreatment system according to claim 1, comprising the following steps:
ascertaining a soot load on the particulate filter,
heating up the exhaust system by means of internal engine-heating measures until the second catalytic converter has reached its light-off temperature, simultaneously injecting fuel by means of the fuel injector into the exhaust gas channel downstream from the three-way catalytic converter that is situated close to the engine and upstream from the feed point, and blowing a regulated volume of secondary air through the feed point into the exhaust gas channel downstream of the fuel injector and upstream from the second catalytic converter by means of an air pump and air valve downstream from the three-way catalytic converter that is situated close to the engine and upstream from the second catalytic converter,
exothermally converting the injected fuel with the secondary air on the catalytically active surface of the second catalytic converter until the particulate filter has reached its regeneration temperature, and
oxidizing the soot particles captured in the particulate filter, whereby the oxygen for the oxidation of the soot particles is supplied by the secondary air system.

10. The method according to claim 9, wherein the internal combustion engine is operated at a stoichiometric air-fuel ratio ($\lambda=1$) during the execution of the method.

11. The method according to claim 9, wherein, during a heating phase of the particulate filter, the fuel injector and the secondary air system establish a stoichiometric or slightly super-stoichiometric air-fuel ratio downstream from the three-way catalytic converter that is situated close to the engine.

12. The method according to claim 9, wherein, during the regeneration of the particulate filter, fuel continues to be injected into the exhaust gas channel downstream from the three-way catalytic converter that is situated close to the engine.

13. The method according to claim 9, wherein the internal engine-heating measures are maintained during the heating phase of the particulate filter and/or during the regeneration of the particulate filter.

\* \* \* \* \*